(12) United States Patent
McReynolds

(10) Patent No.: US 10,902,116 B2
(45) Date of Patent: Jan. 26, 2021

(54) SYSTEMS AND METHODS TO DETECT AND NEUTRALIZE MALWARE INFECTED ELECTRONIC COMMUNICATIONS

(71) Applicant: eBay Inc., Mountain View, CA (US)

(72) Inventor: Joren Bartley McReynolds, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/546,944

(22) Filed: Aug. 21, 2019

(65) Prior Publication Data

US 2020/0082073 A1 Mar. 12, 2020

Related U.S. Application Data

(63) Continuation of application No. 15/649,808, filed on Jul. 14, 2017, now Pat. No. 10,430,583, which is a continuation of application No. 12/977,964, filed on Dec. 23, 2010, now Pat. No. 9,710,645.

(51) Int. Cl.
*G06F 21/55* (2013.01)
*H04L 29/06* (2006.01)

(52) U.S. Cl.
CPC ...... *G06F 21/554* (2013.01); *G06F 2221/031* (2013.01); *H04L 63/145* (2013.01)

(58) Field of Classification Search
CPC ............. G06F 21/544; G06F 2221/031; G06F 21/566; G06F 21/157; H04L 63/145; H04L 63/1466

See application file for complete search history.

(56) References Cited

U.S. PATENT DOCUMENTS

| | | |
|---|---|---|
| 8,001,606 B1 | 8/2011 | Spertus |
| 8,776,227 B1 | 7/2014 | Glick et al. |
| 9,710,645 B2 | 7/2017 | McReynolds |
| 10,430,583 B2 | 10/2019 | McReynolds |
| 2006/0253446 A1 | 11/2006 | Leong et al. |
| 2009/0070869 A1 | 3/2009 | Fan et al. |
| 2009/0313261 A1 | 12/2009 | Corella |
| 2010/0024033 A1 | 1/2010 | Kang et al. |
| 2011/0072262 A1 | 3/2011 | Amir et al. |
| 2012/0167217 A1 | 6/2012 | Mcreynolds |
| 2017/0316205 A1 | 11/2017 | Mcreynolds |

OTHER PUBLICATIONS

U.S. Appl. No. 12/977,964, dated Dec. 23, 2010, Issued.
U.S. Appl. No. 15/649,808, dated Jul. 14, 2017, Issued.
(Continued)

*Primary Examiner* — Paul E Callahan
(74) *Attorney, Agent, or Firm* — Shook, Hardy & Bacon LLP

(57) ABSTRACT

Systems and methods to detect and neutralize malware infected electronic communications are described. The system may receive a request for interface information from over a network from a client machine. In response to receiving the request the system may generate the interface information to include at least one input mechanism to receive user information from the user and countermeasure information for utilization on the client machine to detect whether the interface information is modified on the client machine to receive user information from the user that is not authorized. Finally, the system may communicate the interface information, over the network, to the client machine.

20 Claims, 5 Drawing Sheets

(56) References Cited

OTHER PUBLICATIONS

Advisory Action received for U.S. Appl. No. 121977,964, dated Apr. 12, 2013, 3 pages.
Appeal Brief received for U.S. Appl. No. 12/977,964, dated Jul. 11, 2013, 22 pages.
Appeal Decision received for U.S. Appl. No. 12/977,964, dated May 27, 2016, 7 pages.
Applicant Interview Summary received for U.S. Appl. No. 12/977,964, dated Jun. 15, 2017, 2 pages.
Decision on Pre-Appeal Brief Request received for U.S. Appl. No. 12/977,964, dated Jun. 11, 2013, 2 pages.
Examiner's Answer to Appeal Brief received for U.S. Appl. No. 12/977,964, dated Feb. 14, 2014, 19 pages.
Final Office Action received for U.S. Appl. No. 12/977,964, dated Jan. 29, 2013, 17 pages.
Non-Final Office Action received for U.S. Appl. No. 12/977,964, dated Aug. 11, 2016, 19 pages.
Non-Final Office Action received for U.S. Appl. No. 12/977,964, dated Oct. 09, 2012, 15 pages.
Notice of Allowance received for U.S. Appl. No. 12/977,964, dated Mar. 08, 2017, 9 pages.
Pre-Appeal Brief Request received for U.S. Appl. No. 12/977,964, dated Apr. 29, 2013, 5 pages.
PTO Response to Rule 312 Communication received for U.S. Appl. No. 12/977,964, dated Jun. 21, 2017, 3 pages.
Reply Brief dated Apr. 14, 2014, for U.S. Appl. No. 12/977,964, 10 pages.
Response to Final Office Action dated Mar. 28, 2013, for U.S. Appl. No. 12/977,964, dated Jan. 29, 2013, 22 pages.
Response to Non-Final Office Action dated Jan. 9, 2013 for U.S. Appl. No. 12/977,964, dated October 9, 2012, 14 pages.
Response to Non-Final Office Action dated Nov. 11, 2016, for U.S. Appl. No. 12/977,964, dated Aug. 11, 2016, 18 pages.
Reis et al., "Detecting In-Flight Page Changes with Web Tripwires", Retrieved from the Internet URL: <https://www.gribble.org/papers/nsdi2008.pdf>, 2008, 31-44 pages.
Response to Decision on Appeal filed on Jul. 27, 2016 for U.S. Appl. No. 12/977,964, dated May 27, 2016, 17 pages.
312 Amendment filed on Jun. 8, 2017, for U.S. Appl. No. 12/977,964, 7 pages.
Appeal Brief filed for U.S. Appl. No. 121977,964, dated Aug. 19, 2013, 6 pages.
Response to Non-Final Office Action filed on May 10, 2019 for U.S. Appl. No. 15/649,808, dated Apr. 35, 2019, 9 pages.
Final Office Action received for U.S. Appl. No. 15/649,808, dated Jun. 27, 2018, 18 pages.
Non-Final Office action received for U.S. Appl. No. 15/649,808 dated Dec. 15, 2017, 16 pages.
Non-Final Office action received for U.S. Appl. No. 15/649,808 dated Apr. 5, 2019, 6 pages.
Notice of Allowance received for U.S. Appl. No. 15/649,808, dated Jan. 30, 2019, 8 pages.
Notice of Allowance received for U.S. Appl. No. 15/649,808, dated Sep. 21, 2018, 10 pages.
Notice of Allowance received for U.S. Appl. No. 15/649,808, dated May 15, 2019, 12 pages.
Preliminary Amendment filed on Jul. 27, 2017, for U.S. Appl. No. 15/649,808, 8 pages.
Response to Final Office Action filed on Aug. 27, 2018, for U.S. Appl. No. 15/649,808, dated Jun. 27, 2018, 14 pages.
Response to Non-Final Office Action filed on Feb. 28, 2018 for U.S. Appl. No. 15/649,808, dated Feb. 28, 2018, 14 pages.

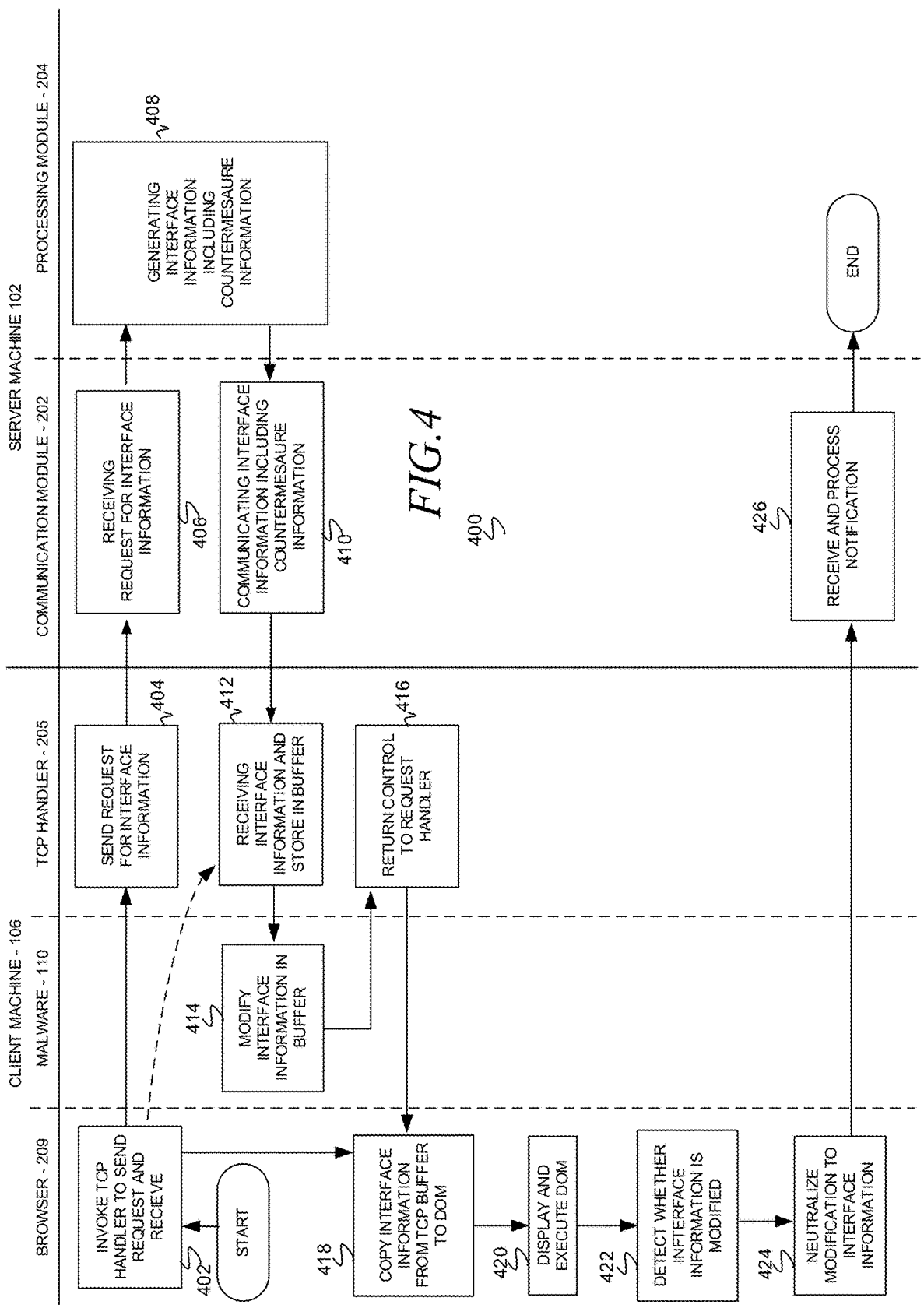

SYSTEMS AND METHODS TO DETECT AND NEUTRALIZE MALWARE INFECTED ELECTRONIC COMMUNICATIONS

PRIORITY

This application is a continuation of and claims the benefit of priority to U.S. patent application Ser. No. 15/649,808, entitled "SYSTEMS AND METHODS TO DETECT AND NEUTRALIZE MALWARE INFECTED ELECTRONIC COMMUNICATIONS," filed on Jul. 14, 2017, issued as U.S. Pat. No. 10,430,583, on Oct. 1, 2019, which application is a continuation of and claims the benefit of priority to U.S. patent application Ser. No. 12/977,964, entitled "SYSTEMS AND METHODS TO DETECT AND NEUTRALIZE MALWARE INFECTED ELECTRONIC COMMUNICATIONS," filed on Dec. 23, 2010, issued as U.S. Pat. No. 9,710,645, on Jul. 18, 2017 which are hereby incorporated by reference herein in their entirety.

TECHNICAL FIELD

This disclosure relates to the technical field of data communications and, more particularly, to systems and methods to detect and neutralize malware infected electronic communications.

RELATED ART

The Internet is a powerful tool that enables machines to communicate and receive information. It may nevertheless pose a serious threat to a user who operates a machine that is infected with malware.

BRIEF DESCRIPTION OF THE DRAWINGS

Embodiments illustrated by way of example and not limitation in the figures of the accompanying drawings, in which:

FIG. 4 is a block diagram illustrating a method to detect neutralize malware infected electronic communications, according to an embodiment;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to detect and neutralize malware infected electronic communications. Various embodiments are described below in connection with the figures provided herein.

Figure 1:
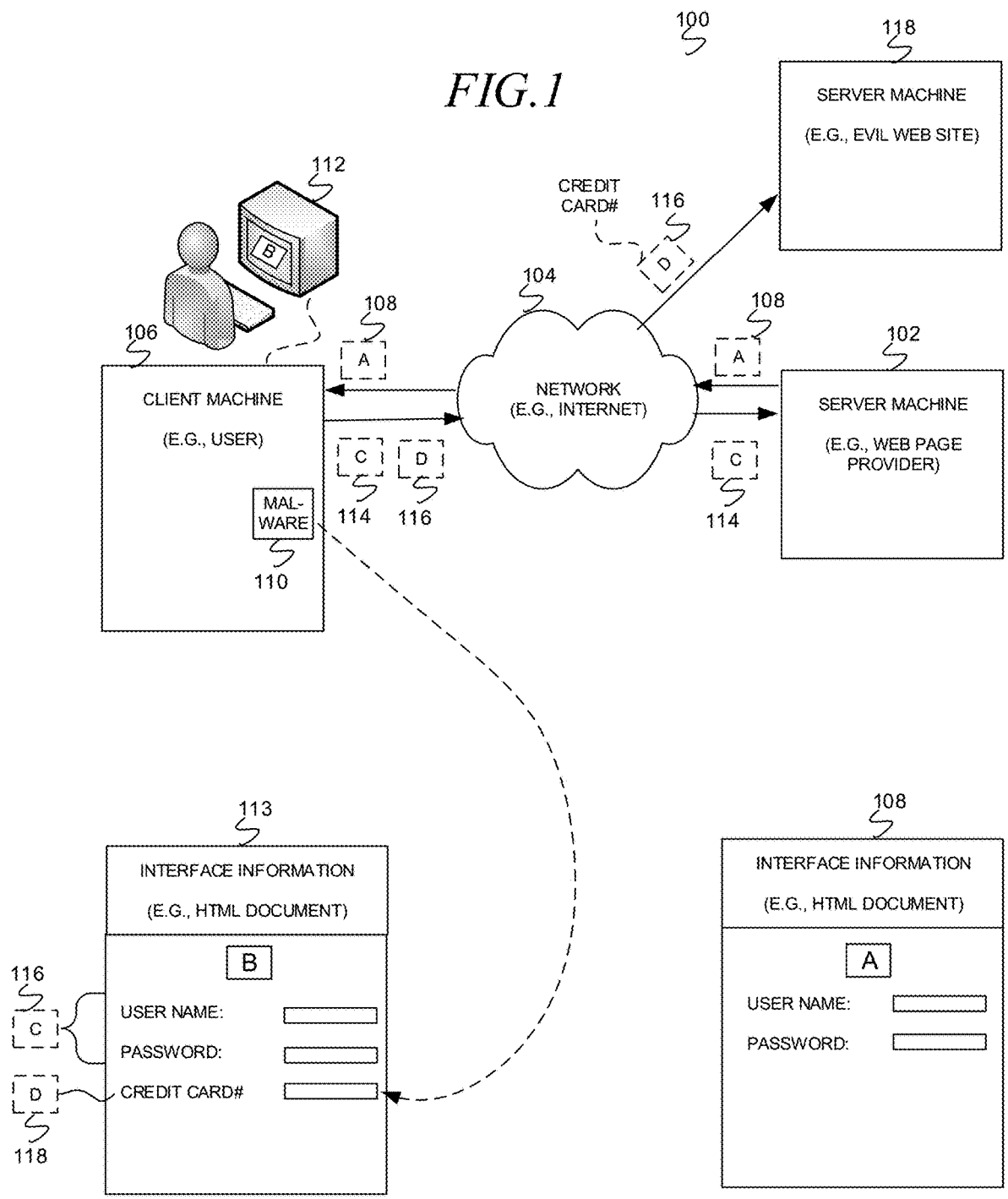
FIG. 1 is a block diagram illustrating a system infected with malware.

FIG. 1 is a block diagram illustrating a system 100, according to an embodiment. The system 100 is shown to include a server machine 102 that communicates over a network 104 (e.g., Internet) with a client machine 106. The server machine 102 may communicate interface information 108 (e.g., web page) to the client machine 106 that may be displayed on a display device 112 to request input information from a user. To this end, the interface information 108 may include a first input mechanism that receives a "user name" and a second input mechanism that receives a "password." The interface information 108 may be received at the client machine 106 and intercepted by malware 110 that modifies the interface information 108 to yield the interface information 113. The interface information 113 includes not only the previously mentioned first and second input mechanisms but also a third input mechanism to fraudulently request and receive a credit card number from the user. Accordingly, the server machine 102 may display the interface information on the display device 112 to the user who provides the requested username, password, and credit card number and submits the requested information to the client machine 106. Responsive to the submission, the client machine 106 communicates two responses over the network 104 including a response 114 that includes the "username" and "password" to the server machine 102 and a response 116 that includes the credit card number to the server machine 118. Accordingly, the operator(s) of the server machine 102 and the operator(s) of the client machine 106 (e.g., user) are unaware that the server machine 118 has fraudulently obtained the credit card number.

Figure 2:
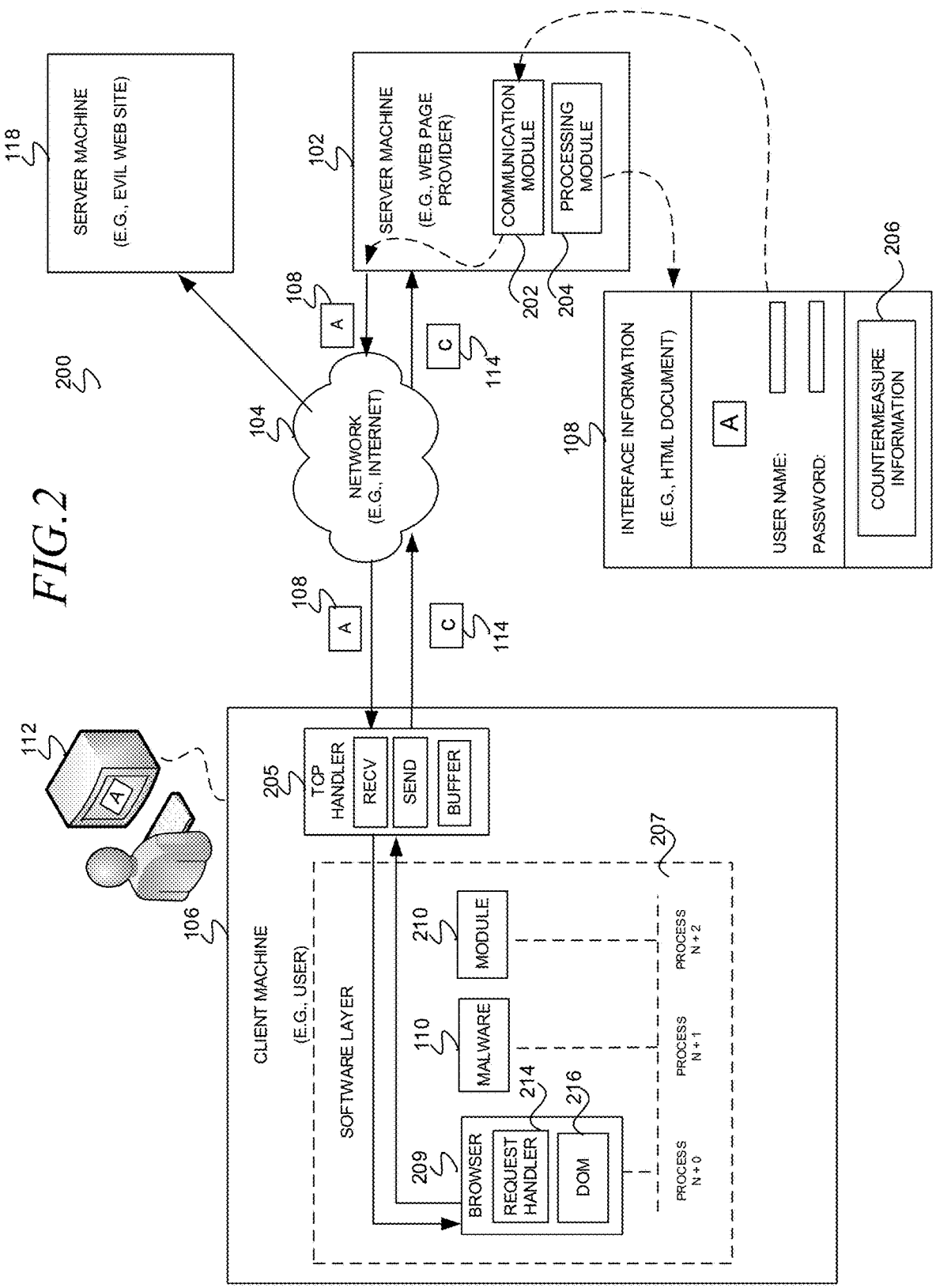
FIG. 2 is a block diagram illustrating a system, according to an embodiment, to execute the methods described herein.

According to a first aspect of the present disclosure a system may receive a request for interface information (e.g., web page), over a network, from a client machine. Responsive to the request the system may retrieve or generate interface information and communicate the interface information, over the network, to the client machine. The interface information may include at least one input mechanism and countermeasure information. The one or more input mechanisms may be accessed via a document object model (DOM) by a browser to display prompts for and receive information from a user who is operating the client machine. For example, according to one embodiment a first input mechanism may request a "user name" and a second input mechanism may request a "password." The countermeasure information may be utilized on the client machine to detect whether the interface information is modified on the client machine without authorization and to further neutralize the effects of such a modification. To this end, the countermeasure information may include a countermeasure module that executes under the browser on the client machine to identify modifications to the interface information. Specifically, the countermeasure module may identify any input elements (e.g., input mechanisms) injected by malware into the interface information. For example, the countermeasure module may identify an input mechanism that prompts for and receives a credit card number from the user. The countermeasure module may further respond to the detection of the modification interface information by neutralizing the effects of the modification. For example, the countermeasure module may remove the maliciously added content and/or send a notification. For example, the counter measure module may communicate the notification to the client and/or the system (e.g., server(s)) that, in turn, redirects the user to a "cleanup" page that identifies an Anti-virus company and/or provides virus removal instructions. The client and server may further respond to the notification by restricting the activity of the user. For example, the client or server may restrict activity by prohibiting the user from executing transactions that require a credit card number FIG. 2 is a block diagram illustrating a system 200, according to an embodiment, to execute the methods described herein. The system 200 resembles system 100 of FIG. 1 but is modified to detect and neutralize malware infected electronic communications. The system 200 is shown to include a server machine 102, a client machine 106 and a server machine 118 that communicate over a network 104 (e.g., Internet).

The server machine 102 includes a communication module 202 and a processing module 204. The communication module 202 may receive a request for the interface information 108. For example, the communication module 202 may receive a request (not shown) for the interface information 108 from the client machine 106. Responsive to receiving the request, the communication module 202 may invoke the processing module 204 to generate or retrieve the interface information 108. For example, the processing module 204 may generate the interface information 108 to include a first input mechanism that receives the username, a second input mechanism that receives the password and countermeasure information 206 that includes a countermeasure module (not shown) to detect and neutralize malware infected electronic communications (e.g., interface information 108). The communication module 202 may further communicate the interface information 108 over the network to the server machine 102.

The client machine 106 is shown to include a transmission control protocol (TCP) handler 205 and a software layer 207. The TCP handler 205 may be embodied as one of the core protocols of the Internet Protocol suite to provide a reliable and ordered delivery of a stream of bytes from a software module on one computer to a software module on another computer. Accordingly, the TCP handler 205 may be utilized by the processes that execute in the software layer 207 of the client machine 106 to send and receive messages over the network 104 (e.g., Internet) to and from modules that execute on other computers including server machines 102, 118. For example, in one embodiment the messages may include electronic communications in the form of requests for interface information 108 and interface information 108. The TCP handler 205 is shown to include a receive module, a send module, and a buffer. Accordingly, the receive module in the TCP handler 205 may be invoked by a process in the software layer 207 to receive the interface information 108 from the network 104, store the interface information 108 in a buffer associated with the TCP handler 205, and return program control to the process in the software layer 207 that invoked the TCP handler 205 along with a pointer to the buffer.

The software layer 207 includes multiple processes that concurrently execute on the client machine 106. For example, the software layer 207 may include processes in the form of a browser 209, malware 110, and a module 210. The malware 110 may execute responsive to soliciting a selection from the user at the client machine 106 or by some other trickery. For example, the software layer 207 may be infected responsive to user selecting an e-mail attachment or the user selecting a link on a webpage. Alternatively, the software layer 207 may be infected with an exploit. An exploit may be software, data, or sequence of commands that seize upon a vulnerability of a software component to take program control from a computer and configure the computer to the ends and purposes of its own. For example an exploit may invoke a software component (e.g., Adobe Flash) with a pointer to block of data that intentionally exceeds the size specifications of the software component to cause a system exception in the form of a buffer overflow. For example, responsive to a system exception, the malware 110 may receive complete control of the client machine 106. Whether by means of a user selection or an exploit, the malware 110 utilizes the program control by modifying the code of (e.g., patching) the receive module of the TCP handler 205 and to spawn a process in the computer under which the malware 110 may concurrently execute in the background. In the present example, the code modification to the receive module of the TCP handler 205 is utilized by the malware 204 to receive program control after the receive module of the TCP handler 205 has received and copied the interface information 108 into the buffer associated with the TCP handler 205. Henceforth, a process may invoke the receive module in the TCP handler 205 that, in turn, passes program control to the malware 110 that, in turn, infects the electronic communications (e.g., interface information 108) that is stored in the buffer associated with the TCP handler 205. For example, as previously described, the malware 110 may infect the interface information 108 by inserting an input mechanism into the interface information 108 that requests and receives a credit card number from the user.

The browser 209 includes a request handler 214 and a document object module (DOM) 216. According to an embodiment the browser 209 may be embodied as the Internet Explorer browser developed by Microsoft Corporation of Redmond, Wash. State. The request handler 214 may invoke the send module in the TCP handler 205 and the receive module in the TCP handler 205. For example, the request handler 214 may invoke the send module in the TCP handler 205 to send a request for interface information 108 over the network to the server machine 102. Further, the request handler 214 may invoke the receive module in the TCP handler 205 to receive the interface information 108 communicated from over the network from the server machine 102. For example, the request handler may invoke the receive module in the TCP handler 205 to receive the interface information 108 from the server machine 102. Responsive receiving control back from the receive module in the TCP handler 205, the request handler 214 may copy the interface information 108 from the buffer associated with the TCP handler 205 to the DOM 216 in the browser 209. The DOM is an interface-oriented application programming interface that enables navigation of a tree of "Node" objects included the interface information 108. For example, the interface information 108 may include elements that may be navigated by the browser via the DOM. The elements (e.g., input elements, countermeasure information, etc.) may respectively contain both data components that may be accessed by the browser 209 and software components that may be executed by the browser 209. Accordingly, the DOM 216 may enable execution of the interface information 108 including a countermeasure module to detect whether the interface information 108 has been modified on the client machine 106. The countermeasure module may utilize countermeasure information in the form of white list information or black list information to detect whether the interface information 108 has been modified on the client machine 106. Responsive to detecting an unauthorized input element in the form of an input mechanism, the countermeasure module may neutralize the input mechanism by removing the unauthorized input element and/or sending a notification to the client machine 106 and/or the server machine 102, that, in turn, redirect the user to a "cleanup" page that identifies an Anti-virus company and/or provides virus removal instructions. The client machine 106 and server machine 102 may further respond to the notification by restricting the activity of the user. For example, the restricted activity may include transactions that require a credit card number.

Further, while the system 200 shown in FIG. 2 employs a client-server architecture, embodiments of the present disclosure are, of course, not limited to such an architecture and could equally well find application in a distributed, or peer-to-peer, architecture system, for example. The various modules 202, 204, 206, 209, 206, etc.) could also be implemented as standalone software programs, which do not necessarily have networking capabilities.

Figure 3A:
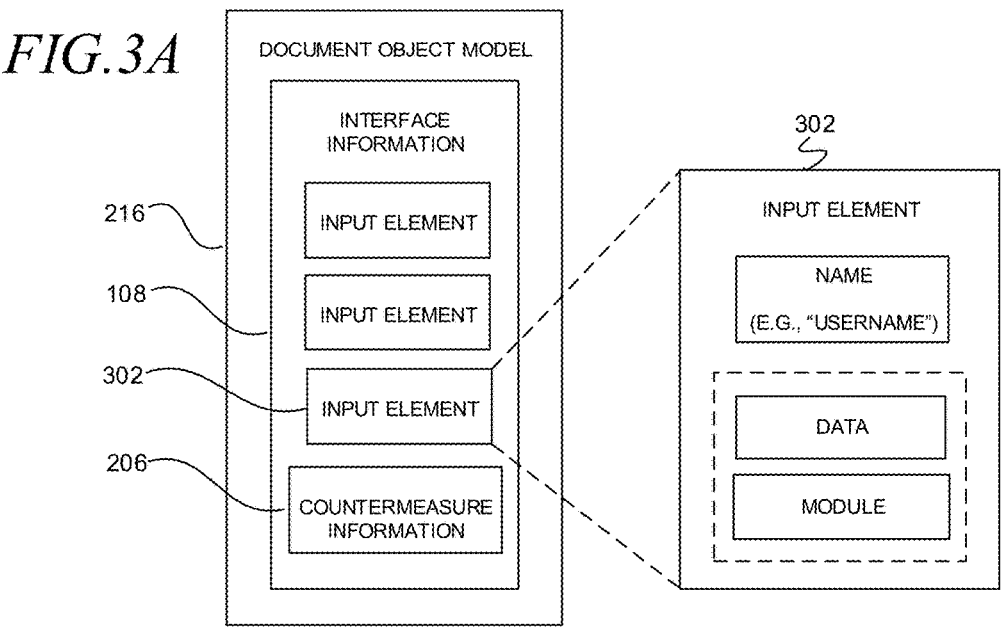
FIG. 3A is a block diagram illustrating a document object model, according to an embodiment.

FIG. 3A is a block diagram illustrating a document object model 216, according to an embodiment. The document object model 216 includes interface information 108. For example, the interface information 108 (e.g., web page) may have been received from a remote computer. The interface information 108 includes input elements 302 and countermeasure information 206. The input element 302 may take the form of input mechanisms that prompts for and receives information from a user. Each input element 302 may include a name and optional information including data and/or a module. The name may uniquely identify the input element 302 from other input elements 302. For example, the name may include "username" or "password." The data may include a string of text that is displayed to the user or control characters that may be used to format the string of text on the display device. The module may be executed by the browser 209 of FIG. 2 to display the string, receive user information from the user, and communicate the user information to the requesting computer.

Figure 3B:
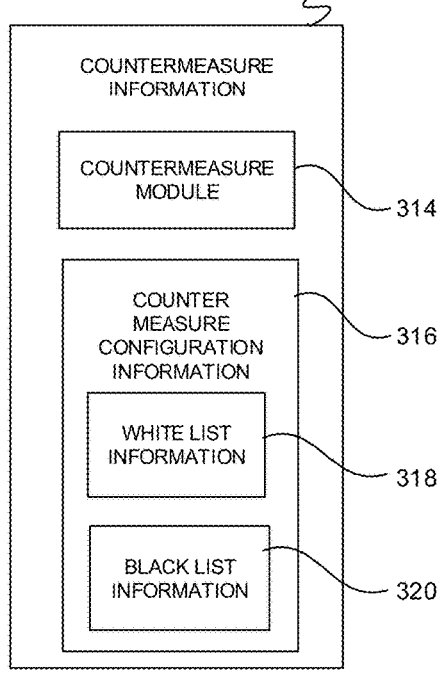
FIG. 3B is a block diagram illustrating countermeasure information, according to an embodiment.

FIG. 3B is a block diagram illustrating countermeasure information 206, according to an embodiment. The countermeasure information 206 may include a countermeasure module 314 and countermeasure configuration information 316. The countermeasure module 314 may be embodied as JavaScript, Adobe Flash, Microsoft Silverlight, or some other technology that emphasizes multimedia, animations and graphics according to one embodiment. The countermeasure module 314 may further execute in the context of another module (e.g., browser), or as a stand-alone module. The countermeasure configuration information 316 may include white list information 318 and black list information 320.

Figure 3C:
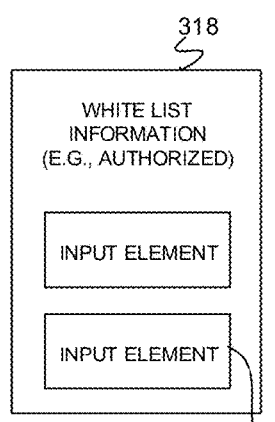
FIG. 3C is a block diagram illustrating white list information, according to an embodiment.

FIG. 3C is a block diagram illustrating white list information 318, according to an embodiment. The white list information 318 may be utilized by the countermeasure module 314 to identify input elements 302 in the form of input mechanisms that are authorized to prompt for and receive user information in association with the interface information 108 of FIG. 3A. According to one embodiment, each input element 302 may include a name without data or a module.

Figure 3D:
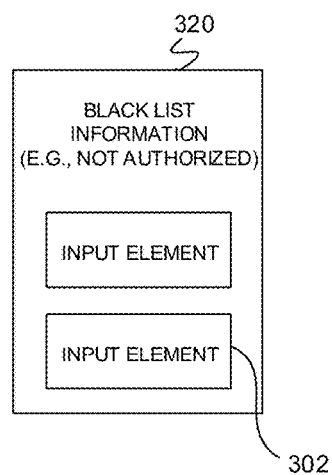
FIG. 3D is a block diagram illustrating black list information, according to an embodiment.

FIG. 3D is a block diagram illustrating black list information 320, according to an embodiment. The black list information 320 may be utilized by the countermeasure module 314 of FIG. 3B to identify input elements 302 in the form of input mechanisms that are not authorized. For example, the input elements identified by the black list information 320 are not authorized to prompt for or receive user information in association with the interface information 108 of FIG. 3A.

FIG. 4 is a block diagram illustrating a method 400, according to an embodiment, to detect and neutralize malware infected electronic communications. Illustrated on the left are operations that may be performed by a client machine 106 and illustrated on the right are operations that may be performed by the server machine 102. On the left the client machine 106 may utilize a browser 209, malware 110, or the TCP handler 205 to perform operations and on the right the server machine 102 may utilize a communication module 202 or a processing module 204 to perform operations.

The method 400 commences at the client machine 106, at the operation 402 with the browser 209 invoking the send module in the TCP handler 205 to request interface information 108 and the receive module in the TCP handler 205 to receive the requested interface information 108 of FIG. 3A. For example, the browser 209 may invoke the send and receive modules in the TCP handler 205 responsive to receiving a selection of a link that points to a web page from a user who is operating the client machine 106. At operation 404, the send module in the TCP handler 205 sends or communicates a request for the interface information 108 to the server machine 102.

At the server machine 102 and operation 406, the communication module 202 may receive the request for the interface information 108. At operation, the processing module 204 may generate the interface information 108 responsive to receiving the request. For example, the processing module 204 may generate the interface information to include a first input element 302 of FIG. 3A in the form of an input mechanism to display a prompt for and to receive a user name, a second input element 302 in the form of an input mechanism to display a prompt for and to receive a password, and countermeasure information 206 of FIG. 3A. The countermeasure information 206 may include a countermeasure module 314 of FIG. 3B and countermeasure configuration information 316 of FIG. 3B, as previously described. At operation 410, the communication module 202 may communicate the interface information 108 including the countermeasure information 206 to the client machine 106.

At the client machine 106 and operation 412, the receive module in the TCP handler 205 may receive the interface information 108 from the network 104, copy the interface information 108 into the buffer associated with the TCP handler 205, and pass program control to the malware 110. At operation 414, the malware 110 may modify the interface information 108 in the buffer associated with the TCP handler 205 to store an input element 302 in the DOM 216 of FIG. 3A in the browser 206. For example, the input element 302 may include an input mechanism that is not authorized in association with the interface information 108. For example, the input mechanism may be configured to fraudulently prompt the user for a credit card number and communicate the credit card number over the network to a computer. At operation 416, the TCP handler 205 receives control back from the malware 110 and passes control to the request handler 214 of FIG. 2 in the browser 209.

At operation 418, the request handler 214 in the browser 209 copies the interface information 108 from the buffer associated with the TCP handler 205 to the DOM 216. At operation 420, the browser 209 may utilize the DOM 216 to access and process the interface information 108. For example the browser 209, may process the input elements 302 and the countermeasure information 206 in the interface information 108. At operation 422, the browser 206 may utilize the countermeasure module 314 to detect whether the interface information 108 is modified. For example, the countermeasure module 314 may utilize white list information 318 to identify whether the interface information 108 includes an input element 302 with a name that is not included in the white list information 318. The countermeasure module 314 may further identify whether an input element 302 in the interface information 108 is not authorized by utilizing the black list information 320 of FIG. 3B. For example, the countermeasure module 314 may identify an input element 302 in the interface information 108 that is not authorized by identifying an input element in the black list information 320 with a name that matches the name of an input element 302 included in the interface information 108. At operation 424, the countermeasure module 314 may neutralize the modification to the interface information 108. For example, the countermeasure module 314 may neutralize the modification by communicating a notification message to the server machine 102 that requests the server machine 102 to restrict activity associated with a user that provides user information that is not authorized.

At the server machine 102 and operation 426, the communication module 202 may receive the notification message and the processing module 204 may process the notification message to restrict an activity associated with the user. For example, the processing module 204 may restrict the user from performing a transaction, accessing a file, or authorizing a payment.

In another embodiment, the countermeasure module 314 may may neutralize the modification to the interface information 108 by removing unauthorized input elements 302 from the DOM 216. For example, the countermeasure module 314 may remove the input element 302 for the credit card number from the DOM 216 to prevent a presentation of the input element 302. In another embodiment the client machine 106 and the server machine 102 may respond to the notification message by redirecting the user to a "cleanup" page that identifies an Anti-virus company and/or provides virus removal instructions. In yet another embodiment any combination of the aforementioned methods of neutralization may be configured to be performed responsive to the detection of the modification of the interface information 108.

Interface Elements

The above-described user interfaces are illustrated to include user interface elements. However, it will be appreciated by those skilled in the art that the user interfaces may also be embodied as a machine interface (e.g., Standard Generalized Markup Language (SGML)) including machine interface elements, an audio interface including audio interface elements, and a kinetic interface including kinetic interface elements.

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage, tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, "Internet" refers to a network of networks. These networks may use a variety of protocols for the exchange of data, including the aforementioned TCP/IP, and additionally asynchronous transfer mode (ATM), system network architecture (SNA), SDI, or some other suitable protocol. These networks may be organized within a variety of topologies (e.g., a star topology) or structures.

Figure 5:
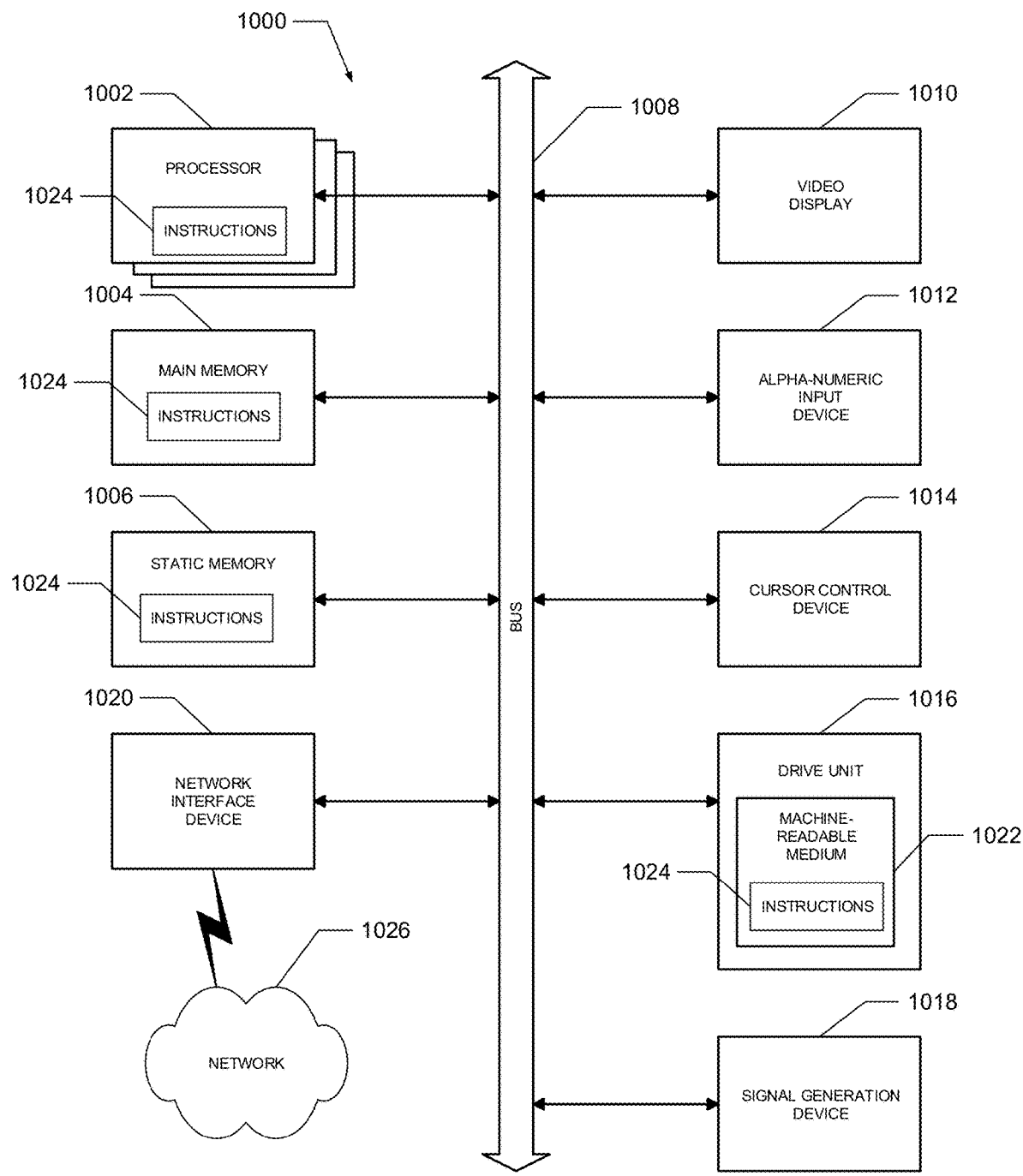
FIG. 5 shows a diagrammatic representation of a machine in the example form of a computer system, according to an example embodiment.

FIG. 5 shows a diagrammatic representation of a machine in the example form of a computer system 1000 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes one or more processors 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g. a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software) 1024 embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Software applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to systems and methods to detect and neutralize malware infected electronic communications were described. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system comprising:
   at least one hardware processor; and
   a computer-readable medium storing executable instructions that, when executed, cause the at least one hardware processor to perform operations comprising:
   receiving, at a server, a request for interface information, the request being received at the server, over a network, from a client machine;
   generating, at the server, interface information, the interface information including:
     a first input mechanism authorized for causing a first prompt to be presented in a user interface to receive user information, and
     countermeasure information enabling the client machine to inspect the interface information on the client machine to detect modification of the interface information to include a second input mechanism not authorized for causing a second prompt to be presented in the user interface to receive user information; and
   communicating the interface information, over the network, to the client machine.

2. The system of claim 1, wherein the interface information comprises a webpage.

3. The system of claim 1, wherein the countermeasure information is configured, at the server, to execute on the client machine.

4. The system of claim 3, wherein the countermeasure information causes virus removal instructions to be displayed to a user of the client machine.

5. The system of claim 3, wherein the countermeasure information causes the client machine to remove the second input mechanism.

6. The system of claim 3, wherein the countermeasure information causes the client machine to remove the second input mechanism responsive to detecting, at the client machine, the interface information being modified.

7. The system of claim 3, wherein the interface information includes white list information.

8. The system of claim 7, wherein the countermeasure information causes the client machine to detect whether the interface information is modified to include the second input mechanism based on the white list information.

9. The system of claim 3, wherein the interface information includes black list information and wherein the countermeasure information causes the client machine to detect whether the interface information is modified to include the second input mechanism based on the black list information.

10. A method comprising:
    receiving, at a server, a request for interface information, the request being received at the server, over a network, from a client machine;
    generating, at the server, interface information, the interface information including:
      a first input mechanism authorized for causing a first prompt to be presented in a user interface to receive user information, and
      countermeasure information enabling the client machine to inspect the interface information on the client machine to detect modification of the interface information to include a second input mechanism not authorized for causing a second prompt to be presented in the user interface to receive user information; and
    communicating the interface information, over the network, to the client machine.

11. The method of claim 10, wherein the interface information includes a webpage.

12. The method of claim 10, wherein the countermeasure information is configured, at the server, to execute on the client machine.

13. The method of claim 12, wherein the countermeasure information causes virus removal instructions to be displayed to a user of the client machine.

14. The method of claim 12, wherein the countermeasure information causes the client machine to remove the second input mechanism.

15. The method of claim 12, wherein the countermeasure information causes the client machine to remove the second input mechanism responsive to detecting, at the client machine, the interface information being modified.

16. The method of claim 12, wherein the interface information includes white list information.

17. The method of claim 16, wherein the countermeasure information causes the client machine to detect whether the interface information is modified to include the second input mechanism based on the white list information.

18. The method of claim 12, wherein the interface information includes black list information and wherein the countermeasure information causes the client machine to detect whether the interface information is modified to include the second input mechanism based on the black list information.

19. A non-transitory machine-readable medium storing instructions that, when executed by one or more hardware processors of machine, cause the machine to perform operations comprising:
    receiving, at a server, a request for interface information, the request being received at the server, over a network, from a client machine;
    generating, at the server, interface information, the interface information including:
      a first input mechanism authorized for causing a first prompt to be presented in a user interface to receive the user information, and
      countermeasure information enabling the client machine to inspect the interface information on the client machine to detect modification of the interface information to include a second input mechanism not authorized for causing a second prompt to be presented in the user interface to receive user information; and
    communicating the interface information, over the network, to the client machine.

20. The non-transitory machine-readable medium of claim 19, wherein the interface information includes black list information and wherein the countermeasure information causes the client machine to detect whether the interface information is modified to include the second input mechanism based on the black list information.

* * * * *